March 16, 1937. A. L. SPAFFORD 2,073,655
MANUFACTURE OF FIBER BAT AND MACHINE THEREFOR
Filed Jan. 8, 1935 7 Sheets-Sheet 1
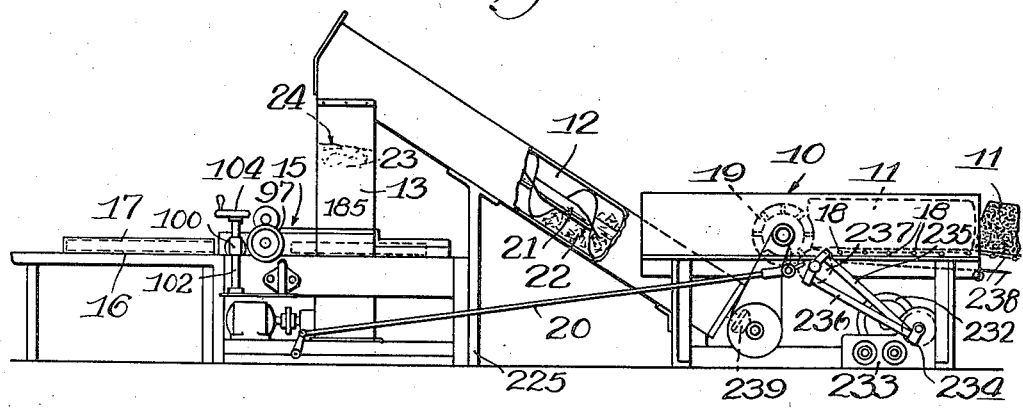
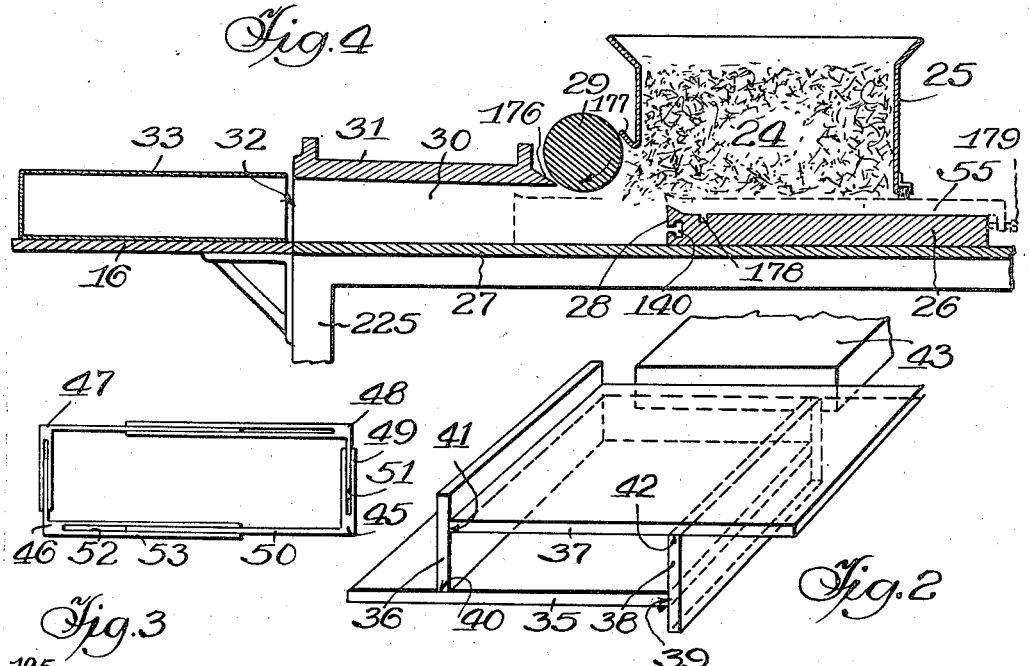
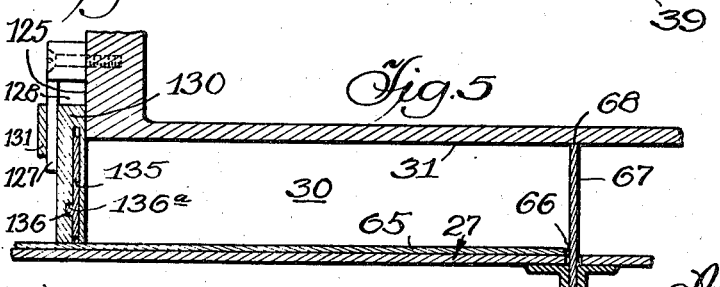
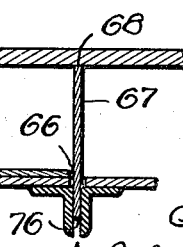
Witness:
Chas. R. Koursh.
Inventor,
Allen L. Spafford,
By W. Bartlett Jones, Atty.

March 16, 1937.　　A. L. SPAFFORD　　2,073,655
MANUFACTURE OF FIBER BAT AND MACHINE THEREFOR
Filed Jan. 8, 1935　　7 Sheets-Sheet 2

Fig. 6

Inventor,
Allen L. Spafford,
By W. Bartlett Jones, Atty.

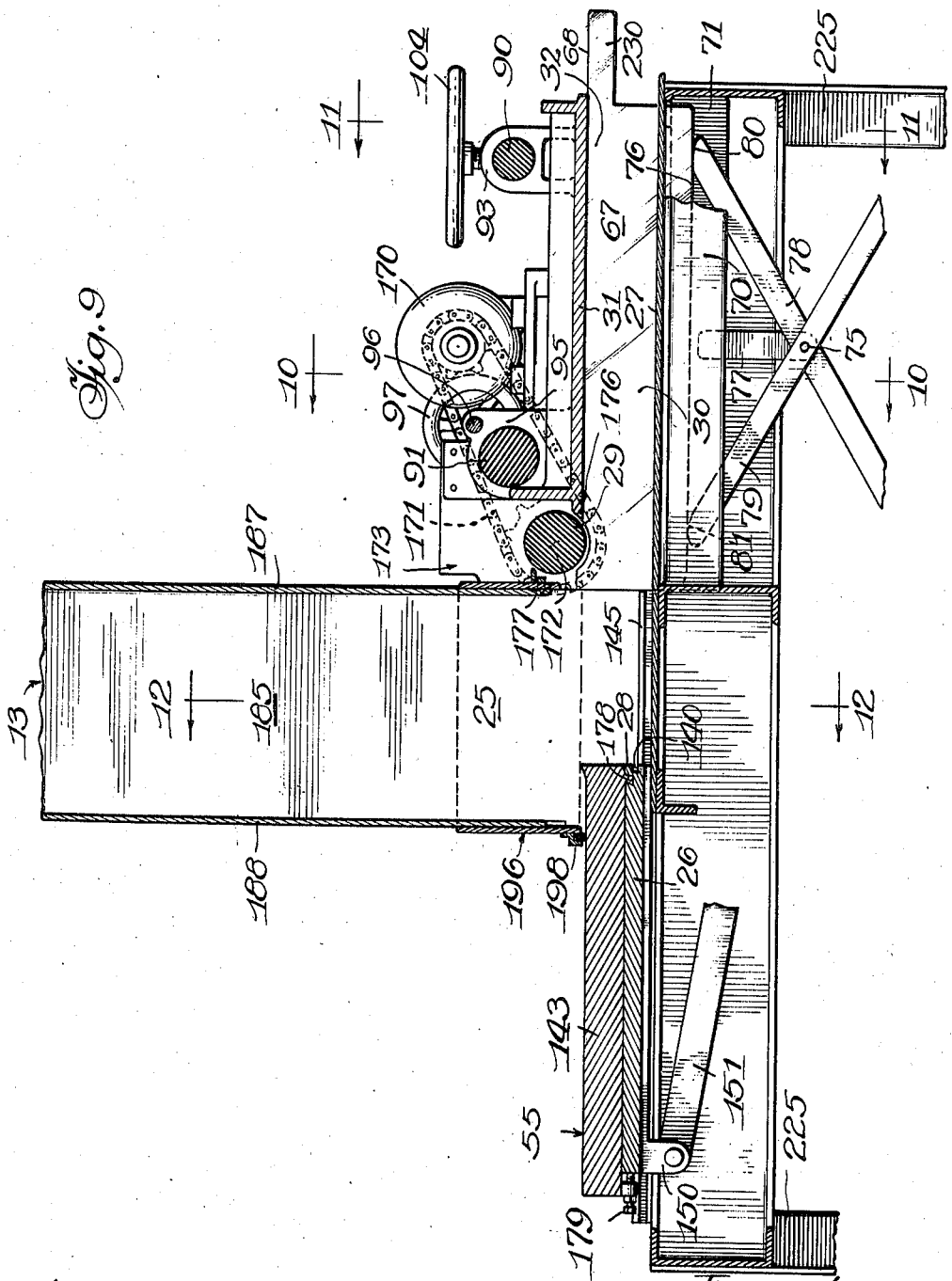

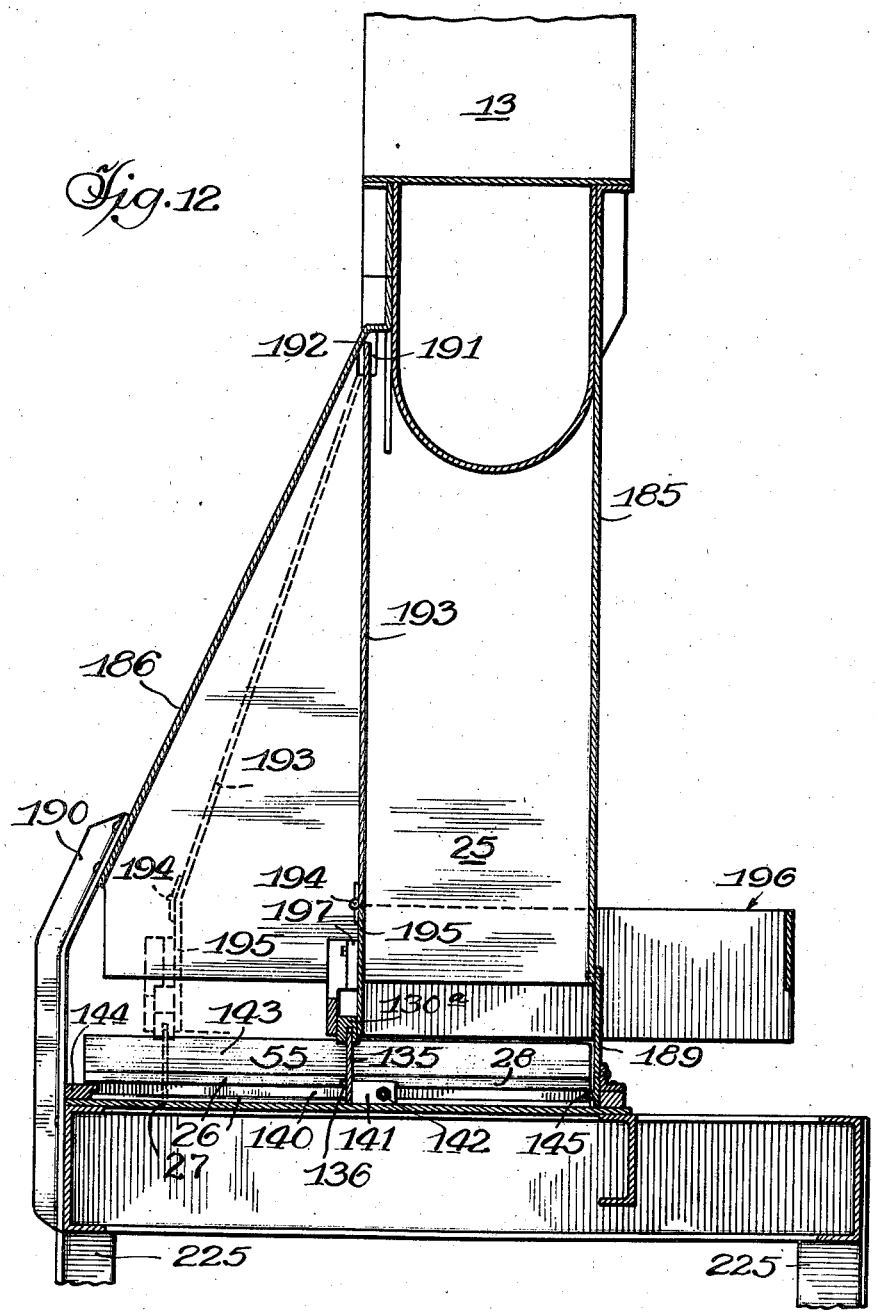

Patented Mar. 16, 1937

2,073,655

UNITED STATES PATENT OFFICE 2,073,655

MANUFACTURE OF FIBER BAT AND MACHINE THEREFOR

Allen L. Spafford, Cloquet, Minn., assignor to Wood Conversion Company, Cloquet, Minn., a corporation of Delaware Application January 8, 1935, Serial No. 858

19 Claims. (Cl. 226—18)

The present invention relates to extrusion of formable material and to apparatus for extruding and forming such material. It has special reference to the extrusion of generally rectangular forms of compressible resilient masses of material which in its individual isolated units is not generally characterized as compressible or resilient, yet which can be compacted to such a mass.

The machine of the present invention is one embodying principles and structures which are susceptible to various modifications, adjustments and changes according to the material extruded, and according to the use of the extruded form of a specific material. Because the invention is capable of such variations I have chosen a particular embodiment and usage which has been quite highly perfected for use in extruding a compact mass of fibrous material in a form of rectangular cross-section, which form has a cohesiveness, a compactness, a compressibility, and a resiliency, as will appear hereinafter. Such material and its specific usage as herein set forth well exemplifies the capabilities and adjustments of the machine and the processes for which said machine is employed. It is therefore to be understood that the invention is not limited to the particularities herein described in explaining and illustrating the invention.

The invention and the machine thereof is herewith described in relation to its design and use for the formation of a filler-body for heat and sound insulation bats or units or slabs, and in particular, sealed slabs or packages containing packed fibers.

The particular form of fiber is one made from wood chips by a moderate cooking operation which softens the chips, after which the chips are rolled or mechanically broken up into small aggregates or splintery bundles larger than the ultimate fibers so useful in paper-making. Such softened chips are preferably broken up while wet, and the resulting pulp may be water-proofed, fire-proofed, or both, and dried.

In the construction of many articles, such as walls, floors and ceilings in buildings, articles such as refrigerators, or sound-proof closets, or cooling chambers, insulated vehicles, etc., recesses are provided between structural elements into which recesses sound or heat insulation is inserted. The recesses may have standard dimensions. To facilitate the insertion of insulation and to assure uniformity of insulation qualities in the finished structure it is desirable to have a previously prepared insulation unit which may be readily inserted into the various recesses.

As herein described a slab is made for use in refrigerator constructions. The small cabinet sizes of refrigerators, such as the household type, comprise an outer casing associated with inner casing, with intervening space. The slabs normally reside in the spaces and fit snugly against both casings. In installation some slabs have a tendency to "pillow" or bunch up as there is relative slippage between a slab and another surface, and the slab may be torn or punctured. Where it is sealed to keep the filler free from access to moisture, this destruction must be avoided. Also, the slabs stand on end, and it is important that the filler does not settle, to leave a void unfilled space in the slab. For these and other reasons the above described form of wood pulp filler is employed which in a mass is compressible and elastic. A type of slab, and the character of fiber used, is described in Corlette and Lee, U. S. Patent No. 1,971,064, issued August 21, 1934.

In making the type of slab of the above-mentioned patent the density of the pulp or filler is very important for standardized productions, and this is controlled entirely by adjusting a machine to a given quality or kind of pulp to maintain a given density of filler.

In making slabs as above referred to, pulp is provided in a highly compact form, as in bales, to save bulk, to obtain lower freight rates, and to enable the user of the slab to make and modify the same as instant demands require. The bales are broken and the pulp expanded, as by shredding it into a loose bulk form. The loose fiber is then suitably conveyed to a hopper wherefrom it is taken and compressed into an extrusion device which is the central item of the machine to be particularly described below. The fibers are entangled in the bulky mass and further in the compression accompanying its entry into the extrusion orifice. The slight rigidity or stiffness of individual fibers gives the compacted mass an expansibility on being released to an unrestrained form, from which it is compressible and again expansible. It is a characteristic that the expansion is slow after compressibility, and not immediate as contrasted with a homogeneous rubber mass, due no doubt to the fact that the fibers are not united together, but are free to slip on each other in the entangled mass. It is a characteristic of the mass that a length of bat extruded by the machine may be forced endwise into a box (or the end of a slab) which is shorter than the normal expanded length of the bat. Upon release, the inserted bat gradually extrudes itself from the box. In making slabs such a length is forced into an envelope and sealed under compression in the mass. This prevents settling of fibers in a slab and exerts pressure on all sides of the filled slab.

A particular feature of such material is the sensitivity of the same to slight changes of dimension in the orifice or spout through which it is extruded. Where the spout tapers in the direction of extrusion the density can be made very great, and the same is true where the sides are parallel. Where a slab of small thickness, and of considerable width is made, and the spout is fairly long, it is even desirable to have a slight flare between the wide faces of the spout. An adjustment of $\frac{1}{16}$ of an inch per foot in the flare of the plates makes an appreciable change in the standard density of bat extruded by the machine. In consequence the machine for such usage is provided with means to set and to control very carefully the flare or taper or parallelism of the wide faces of the spout for such an insulating bat. Other problems of similar import which have been encountered in this particular field have brought about solutions therefor predicated upon certain structures and adjustments of the machine hereinafter described.

One object of the invention is to make a bat of fiber by compressing a bulky mass of fibers into a compressed mass.

Another object of the invention is to permit formation of fiber bats at one place from fiber baled at a remote place, then loosened into bulk form and compressed into a bat.

Still another object of the invention is the provision of a controlled assembly of units which uses baled fiber as raw material and prepares and forms the bat under one control, as it is required to use the formed bat.

Still another object of the invention is the provision of a forming machine for making a bat from bulk fiber.

Another object is the provision of an extrusion spout for forming a bat which is mechanically variable to form differently sized bats, which has a simple form with resulting simple adjustments; which spout may be provided with a taper or a flare, which may be changed in width or thickness for a substantially rectangular cross-section.

Still another object of the invention is the provision of a plunger or ram for feeding bulk fiber into the extrusion spout, which plunger is adaptable by adjustment and/or by building up to accommodate any size to which the spout is adjusted, which is so related to the adjustments of the spout that the plunger is effectively varied automatically with certain adjustments of the spout.

Various other and ancillary objects and advantages of the invention will become apparent from the following description of the process and of the apparatus which is herein supplied, together with the general and specific embodiments of the invention illustrated in the drawings, chosen to illustrate and explain the scope of the invention as set forth in the appended claims.

In the drawings:

Fig. 1 represents a general assembly of bale-breaker, conveyer, bat-forming machine, and slab-making table.

Fig. 2 is a diagrammatic illustration of theoretical perfection in an adjustable spout in accordance with the broad scope of the invention.

Fig. 3 is a modified and improved more mechanically perfected form of a theoretically perfected adjustable spout generally similar to that of Fig. 2.

Fig. 4 is a general more or less diagrammatic representation of a hopper containing bulk fiber, a plunger, and a spout from which the bat is extruded.

Fig. 5 is a detail view of a cross-section of a spout embodying the relations of the spouts of Figs. 2 and 3, which has been employed in the exemplary machine.

Fig. 6 (Sheet 2) is a side view of the forming machine opposite the side illustrated in Fig. 1, discharging a bat to the right.

Fig. 9 (Sheet 5) is a detail longitudinal section of the machine on line 9—9 of Fig. 7, cutting the spout, the hopper and the ram.

Fig. 12 (Sheet 7) is a cross-section of the machine on line 12—12 of Fig. 9, cutting through the hopper to show its construction, and relations with the plunger and spout.

Figure 7:
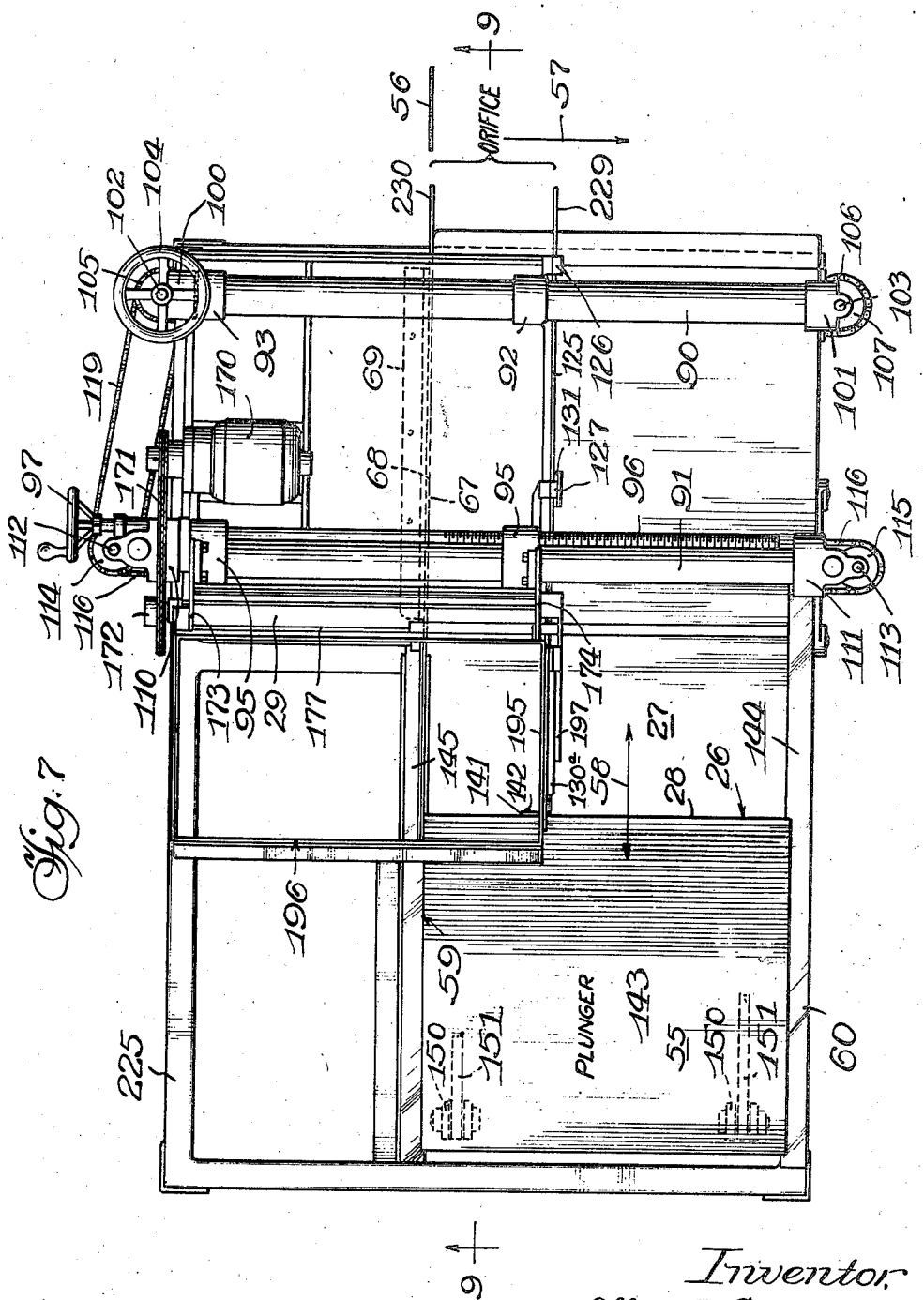
Fig. 7 (Sheet 3) is a plan view of the machine shown in Fig. 6.

In Fig. 1 there is shown a general assembly of bale-breaker 10, for bales 11 of pulp, conveyor 12, hopper 13, forming machine 15 and slab-filling table 16 for slabs 17 to be produced. Bales 11 are fed in on a belt on rollers 18 to a shredding wheel 19 suitably driven by power to provide fiber as the needs of the forming-machine 15 may require. An operating connection 20 between the bale-breaker and the forming machine controls the feed of bales to the shredding wheel 19, and is under the influence of the operation of the slab machine, the latter being subjected to control by an operator. The control of quantity of fiber shredded from the bale-form to the bulk-form in the bale-breaker may be effected by the extent or rate of feed of the bale to the shredding wheel 19. Details of the mechanism are not material to the invention and various devices and structures for the purpose may be used.

The conveyer 12 is a tubular or trough member within which a worm screw 21 receives shredded pulp 22 to raise it to the top of hopper 13, into which it falls maintaining a general level of pulp 23 therein, as for example at the line 24.

Briefly described, the hopper 13 lies above the forming machine, as an extension of a hopper 25 (Fig. 4) and the pulp 24 therein weighs down upon a reciprocating plunger 26 or upon a bed plate 27 of the forming machine. The plunger moves in the bottom of the hopper 25 to receive some of the pulp in front of the head-face 28 of the plunger, and moves to carry such pulp well out of the hopper, past a rotating roll 29, which aids the pushing forward of the pulp, and into a long spout 30 between the bed plate 27 and a top-plate 31. The orifice 32 of the spout extrudes a compressed formed pulp which may be a simple bat lying in form on the table 16, or it may be received, placed, or extruded into a receiver such as an envelope 33 (Fig. 4) to form a slab.

The details of structure of the forming machine are directed to the mounting and adjusting of the parts which form the spout 30, to operation and form of the plunger, and to the association of the hopper structure with the resulting adjustable machine. Primarily, it is the desire to permit of quick and accurate formation of differently sized openings for the spout, and of such other adjustments as may control the density of the extruded form.

Fig. 2 represents more or less diagrammatically a spout structure of theoretical perfection, which, however, is not practically embodied in the machine with the simiplicity shown in Fig. 2. It comprises four plates 35, 36, 37, and 38 forming a rectangular spout, each plate in a counter-clockwise direction, when facing Fig. 2, having edges respectively 39, 40, 41, and 42 abutting against the surfaces of the adjacent plates 36, 37, 38, and 35. Assuming means existent to hold these four plates 35 to 38 in any position of fixation, they may be moved to change the size of the rectangular spout, or even to slight angles to give various tapers or flares to the spout. Working at the rear of the spout and capable of entering it is an illustrative plunger 43. The plunger 43, and the plates 35 and 37 correspond generally with the plunger 26, bed plate 27, and top-plate 31 of Fig. 2.

Another form of diagrammatical and theoretically perfected spout of this character is shown in Fig. 3, wherein there is a telescopic or sliding relation between two-plate adjacent parts forming the spout. These also are capable of forming variously sized openings, flares and tapers. Four angular corner members 45, 46, 47, and 48 each have one of its plates slidable on or in the other plate of the adjacent part, all in one direction around the spout. Thus, for example, the plate 45 has a grooved plate 49 and a thin plate 50. The grooved plate 49 receives a thin plate 51 of part 48, and the thin plate 50 slides in the groove 52 of the grooved plate 53 of the corner part 46. Such a device with suitable friction between its components may be a relatively fixed spout structure in any set position of adjustment. This form lessens the necessity for complicated means separately to mount the four component parts.

Figure 10:
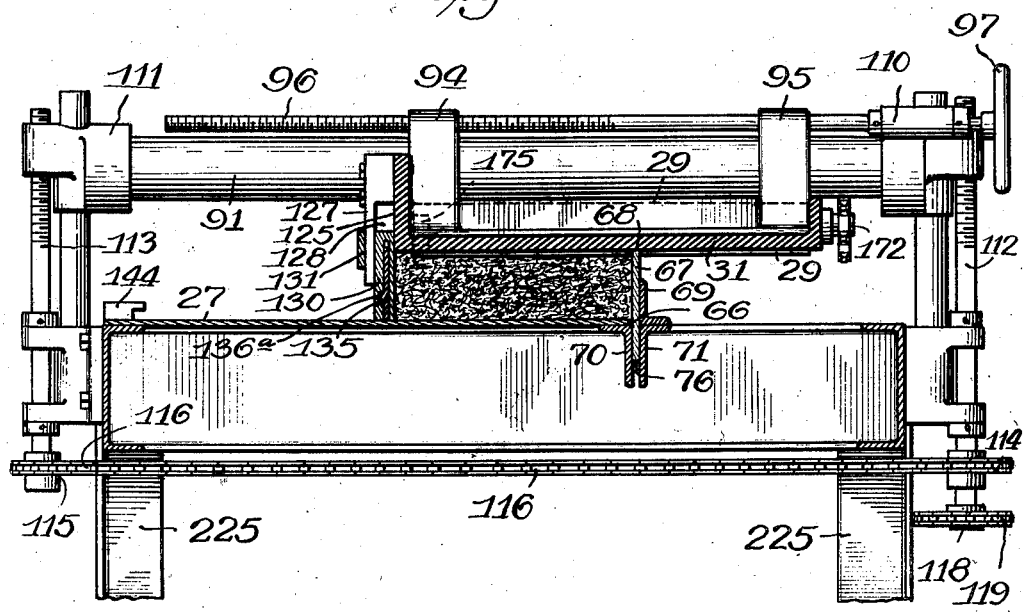
Fig. 10 (Sheet 6) is a cross-section of the machine on line 10—10 of Fig. 9, showing particularly the spout construction, and the rear carrying bar and adjustment for the movable top structure of the spout.
Figure 11:
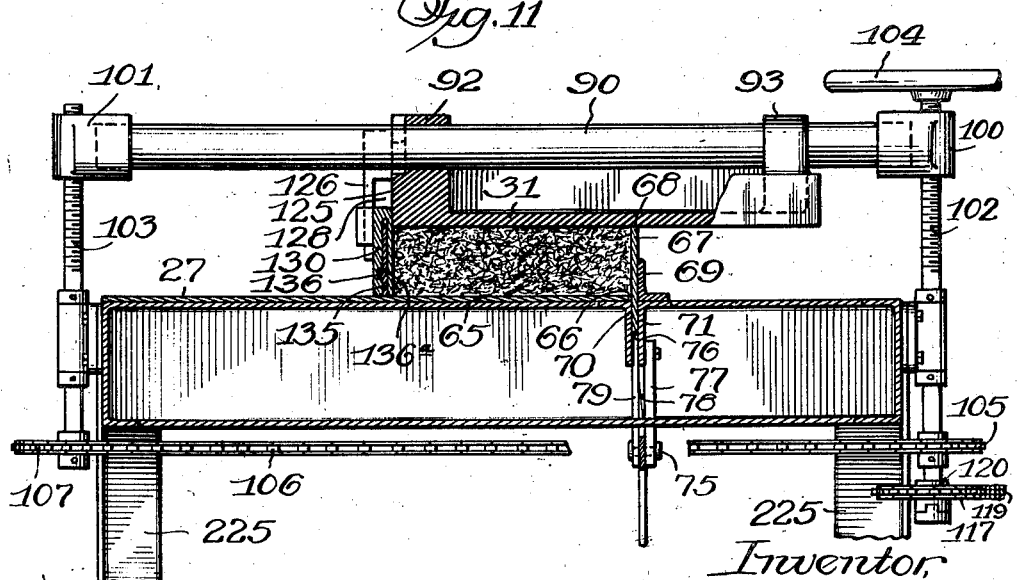
Fig. 11 (Sheet 6) is a cross-section of the machine on line 11—11 of Fig. 9, much like Fig. 10, but taken forward of the front carrying bar to illustrate the latter, and its adjustments to move the parts forming the top of the spout.

Practically, however, the particular machine described herein variously embodies, with other modifications, general relationships borrowed from the schemes of Figs. 2 and 3. The structure is shown in Figs. 5, 10, and 11. Structure is predicated upon a relationship with the plunger which in effect enters the spout, so as to avoid using a differently sized plunger for each size of spout. Another feature in the relation of the spout and plunger to these ends is the effecting of an adjustment operable on the plunger as the spout is adjusted. Since it is not essential that the plunger have a close fit in the spout, a clearance at the top being permissible, the thickness of the plunger 26 (Fig. 4) is variable by attaching on its top, a "thickness plate" 55 selected as required.

Referring first, however, to the plan view of the machine in Fig. 7, there will be found a bracket mark designated "orifice", a fixed line 56 and an arrow 57. The orifice may be widened from the fixed line 56 in the direction of the arrow 57. Over in the lower rear of the view Fig. 7 there is a large square designated "plunger" which is the plunger 26 reciprocating in the direction of the double-headed arrow 58. It will be observed that the fixed line 56 is in line with one edge 59 of the plunger, and that the opposite edge 60 of the plunger is in the line toward which the orifice is widened. There is a vertical plate carried forward of and by the plunger which is adjustable along the face 28 of the plunger, which plate has a sliding fit into one side-wall of the spout, so that as the spout is widened the effective width of the plunger is automatically taken care of. The structure will appear as the description proceeds.

In Figs. 10 and 11, the spout area may be readily distinguished by the stippling indication of pulp. The base or bed plate of the spout is a sheet 65 which remains fixed with an edge 66 against a vertically movable sheet 67 serving as a horizontally fixed but vertically movable wall of the spout. Plate 67 has an edge 68 against top plate 31 of the spout. Angle irons or like structures 69, 70, and 71 provide a vertical slot in which spout side-wall 67 moves. Means is provided to mount the plate 67 in this slot and to urge it constantly upwardly against top plate 31. This means is shown in Figs. 6, 9, and 11. The bottom edge of the plate 67 in Fig. 9 is designated 76. To the plate 7 there is fixed a downward strip 77 with pivot 75. On this pivot are two crossing bars 78 and 79 with their ends 80 and 81, riding in the slot in which the plate 67 moves, and pressing on edge 76 of plate 67. As shown in Fig. 6, the bars 78 at their lower ends form a toggle by connection to other bars 82 and 83 pivoted together onto a heavy weight 84, the weight of which urges plate 67 upwardly.

Returning again to the spout structure, the top plate 31 is movable horizontally across the machine transversely of the direction of extrusion, and in the direction of the arrow 57 in Fig. 7. It slides on parallel carrying bars 90 and 91 which pass respectively through two pairs of supporting lugs 92—93 and 94—95. The lug 94 is threaded to receive a threaded rod 96 turned by hand-wheel 97 (Figs. 7 and 10) to move the top plate horizontally.

There is also a vertical movement for the top plate in its entirety, or only at one end, as desired. This is effected by moving the carrying bars 90 and 91 together vertically, or moving but one of them. Bar 90 (Fig. 11) is carried in blocks 100 and 101 on upright shafts 102 and 103 respectively threaded into the blocks. Shaft 102 (Figs. 7 and 11) carries a hand-wheel 104 to turn the shaft, and is geared to shaft 103 by the parts: sprocket 105, chain 106 and sprocket 107.

The inner carrying bar 91 is mounted in blocks 110 and 111 into which are threaded vertical shafts 112 and 113 respectively operated by the hand wheel 104. For this purpose, the vertical shafts 112 and 113 are geared together by sprockets 114 and 115 and by chain 116. Those vertical shafts on the side of the machine where hand wheel 104 is located, namely 102 and 112, have sprockets 117 and 118 with chain 119 between them. In association with the mounting of sprocket 117 on shaft 102 there is a clutch mechanism generally designated 120, which serves to disconnect the sprocket 117 from the shaft 102, or hand-wheel 104. When disengaged at this clutch 120, the carrier bar 91 cannot be vertically moved by hand-wheel 104, and motion of the carrier bar 90 gives an incline to the top plate. As inclined, the top plate always engages the edge of the spout-side-wall 67, because of the constant urging of said plate upwardly.

Returning again to the spout structure for its fourth side, or the side opposite plate 67, there will be found a different structure which effects a relation with the plunger, which seals the spout against the bed plate 65, and which permits the raising and the tilting of the top plate in the manner above described. For convenience of description a vertical face of the top-plate 31 is designated (at the left in Figs. 10 and 11) as vertically plane by the numeral 125. Outstanding from it are legs or straps 126 and 127 carried by it, which form a vertical space 128 in which there is a vertically slidable plate 130, which rests by its own weight on the bed plate 65. It is held longitudinally by the leg 127 passing into a stirrup 131 attached to the plate, the leg 127 being movable vertically in the stirrup as it is carried up and down with the top plate. The plate 130 defines the side wall of the spout opposite the side wall 67, and it will be seen that these two walls automatically separate as the top plate is moved horizontally to widen the slot by use of the hand-wheel 97.

The relation of the plunger to the spout, as above alluded to is in respect to the side wall 130 just described. Inside the side-wall plate 130 there is a vertical groove in which slides a thin plate 135 which is carried by the plunger and which moves in and out of the side wall during the reciprocation of the plunger. In order to prevent the plate 135 wearing grooves in the bed plate 65 at the different positions, it practically clears the said bed plate by a bead 136 on the plate 135 sliding in a bearing groove 136ᵃ in the plate 130.

The connection of the above described plate 135 to the plunger is best shown by reference to other views. The face 28 of the plunger or ram 26, as shown in Fig. 4 has a T-slot 140 in a horizontal direction. (See also Fig. 12.) Plate 135 has a right angular part 141 which overlies the slot 140 and which carries a headed bolt 142 riding freely in the T-slot 140. The relation is such that the plate 135 may ride across the face of the plunger as the width of the spout is adjusted. Fig. 12 also shows the base of the ram 26 and a thickness plate or pad 143 thereon. It is also to be observed that the sides of the ram 26 are grooved for the guides 144 and 145 on the bed of the machine. The operation of the ram is illustrated in Figs. 6 and 9. On the underside of the ram 26 is a lug 150 pivoted to a link 151, which is pivoted at 152 to an arm 153 oscillating about center 154. It is slotted at 155 for a sliding head 156 carried on the crank arm 157 rotating on axis 158. Suitable mechanism in box 159 is driven by main motor 160. Between the motor 160 and transmission box 159 is a clutch 161 controlled by linkage members 162, 163, 164 to foot pedal 165 under direct control of an operator. By this the operator can stop and start the plunger.

The reciprocation of the ram from the area of the hopper into the area of the spout carrying pulp before the ram for compression in the spout is accompanied by means providing a forward impulse to the pulp at the juncture of the hopper and spout. The preferable form is a simple rotating roll shown as 29 in Fig. 4, travelling with a surface speed considerably greater than the speed of the ram as the ram passes the region. This tends to clear the region and avoid jamming. The structure may be seen in Figs. 4, 6, 7, 8, and 9. The roll 29 is constantly driven by a small independent motor 170, with chain-belt connection 171 with speed reduction. The axis of the roller is shown at 172. In its relation to other parts, the roller is mounted in the frame with the top plate 31 and is movable with it, its motor 170 being mounted on the top of said top plate 31. Bracket plates 173 and 174 carry the roller 29. The roller 29 is indicated by dotted lines in Fig. 10, and its left hand bearing at plate 174 is on a trunnion 175 inside the end of the roller. The top plate 31 has a tip 176 just clearing the roller 29. A space-closing member 177 nearly contacts the roll and is attached to the hopper. As for the ram, the thickness plate or pad 143 thereon is such as to give about $\frac{1}{8}$ inch clearance as it passes under the roller. Incidentally, the changeable pad 143 (Fig. 9) is easily affixed to the fixed ram 26 by its forward end having a key 178 fitting a slot in the ram, and by a locking bolt or screw 179 at the rear of the ram.

The hopper is of both outer and adjustable inner structure (Fig. 12). A permanent hopper is placed over the area representing the widest bat which may be made, and inside of this hopper there is a movable partition which varies the width of the effective hopper at the bottom as the parts are moved to widen the orifice. There is a connection between such movable portion of the hopper and a movable part associated with the orifice to change the hopper width automatically.

Figure 8:
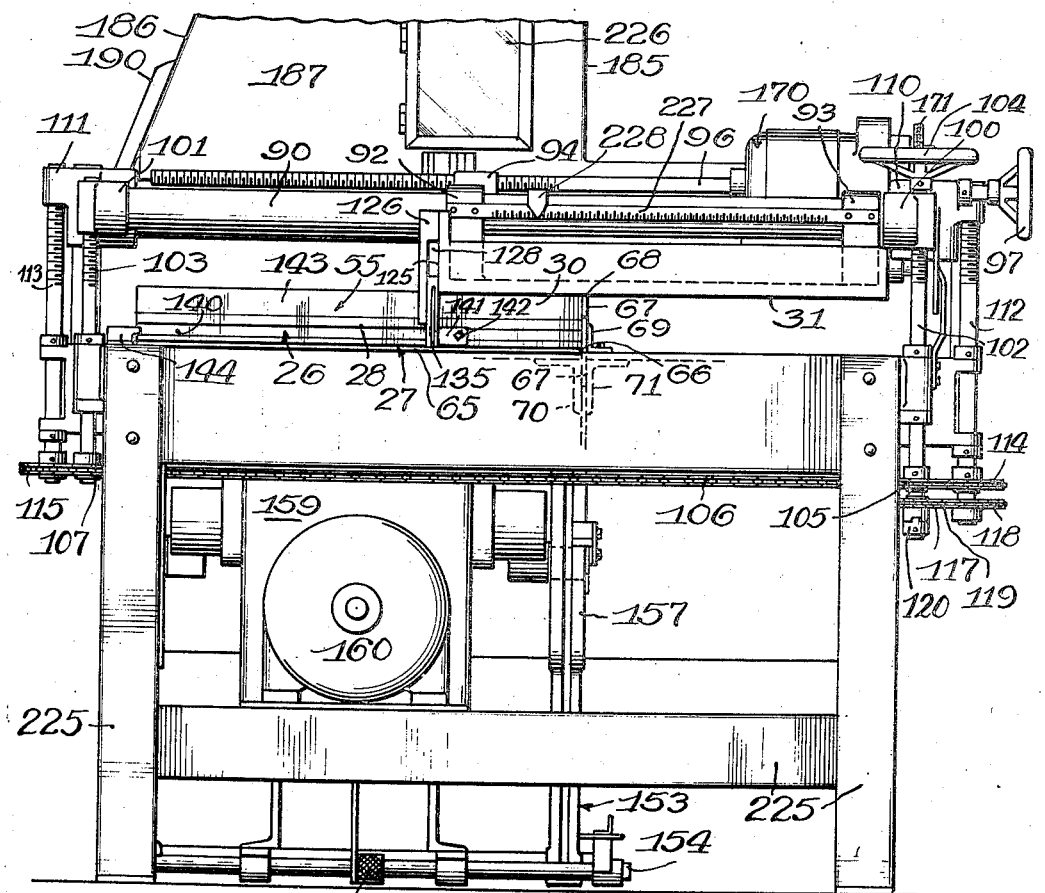
Fig. 8 (Sheet 4) is a front elevation of the machine of Figs. 6 and 7 as viewed from the right of Figs. 6 and 7.

Looking at Figs. 8 and 12 the hopper has a fixed vertical side wall 185 and an opposite slanting permanent side wall 186. In Fig. 9 the other walls 187 and 188 are shown. Wall 185 is secured to a plate 189 on the machine top, and slanting wall 186 is secured to brackets 190 on the machine. Blade 189 is aligned with spout-side-wall blade 67. Slanting side wall 186 provides near its top a groove or slot forming structure 191, into which the edge 192 of a movable partition 193 fits and moves with a sliding pivotal relation. The lower end of partition plate 193 is hinged at 194 to a vertical plate 195, which is part of one plate of a four-sided sheet metal frame generally designated 196 shown in Fig. 12 at the right. The plate 195 bears against guide plate 130ᵃ which is shown as a narrow extension of the main spout-side-wall plate 130. At the rear this extension 130ᵃ serves merely as a guide and moving finger to cause the partition plate to follow the adjustment movement of the orifice. A strap 197 is attached to plate 195 and the extension 130ᵃ is held slidably between the strap and the plate 195. The frame 196 is mounted on the vertically movable parts which mount the top-plate 31. The frame 196 effects a seal between the upper walls of the hopper and the top of the machine as there is vertical adjustment. A felt pad 198 joined to the frame 196 (Fig. 9) slides on the plunger as a seal. The frame 196 is supported in part by the angle iron 177 above named as a seal between the hopper and the roll.

It is to be noted that the extension 130ᵃ of the spout-side-wall plate 130 is also grooved (Fig. 12 where 130ᵃ is in cross-section and Fig. 6 where its side is visible) to receive the thin plate 135 which is attached to the plunger head. It is also to be noted in Fig. 6 that where the main side-wall 130 is cut-down in width to leave the extension 130ᵃ, there is a vertical edge 137. Forward of it at dotted line 138 is the forward edge of the thin plate 135 which slides in the groove of plates 130—130ª. It is to be understood that the vertical line 137 represents cutting of plate 130 to provide clearance for the ram in its forward motion, and that the edge 138 represents the rear position of plate 135 with the ram in rear position. Thus the plate 135 serves to seal the space between the ram face and the spout, when the plunger is in any rearward position.

Incidental parts of the machine which are present for ordinary purposes not essential to the invention are herewith designated for purposes of reference: general framework of the machine 225; door in hopper 226; scale 227 and pointer 228 to register width of orifice; extending finger 229 of spout-side-wall plate 130 and extending finger 230 of spout-side-wall plate 67, both of which guide the extruded bat; motor 232 for shredding wheel 19, gear box 233 for speed control of crank arm 234, linked by rods 235 and 236 to ratchet feed 237 advancing belt 238 carrying bales 11; and drive 239 for conveyer 12.

Figure 13:
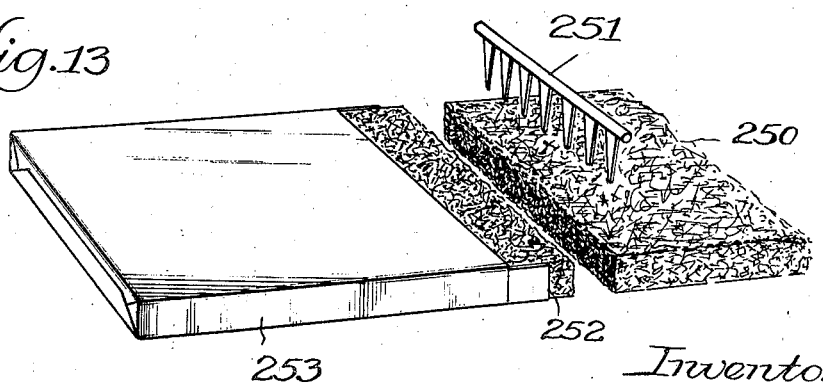
Fig. 13 (Sheet 4) is a diagrammatic representation of an extruded bat and method of using the same in an insulation slab, supplementing the general view in Fig. 1.

In Fig. 13 (see Sheet 4 under Fig. 8) there is shown a coherent form of fiber bat 250 extruded by the device. This bat can be formed of indefinite length as the machine operates, but for making slabs it is severed by hand into lengths. A comb 251 is used in preference to a knife, as it does not compress the bat, and permits it to be torn and divided where it is held by such a comb. Usually the comb is used after a length 252 has been inserted into an envelope 253. The normal length of the bat 252 in the envelope is greater than the length of the envelope, and the bat is finally compressed into the envelope, wherein it tends to expand. Other uses for such a bat are contemplated. The machine also may be used to compress many materials.

The present application is a continuation in part of the applicant's copending application Serial No. 686,177, filed August 21, 1933.

I claim:

1. An extrusion device for forms of generally rectangular cross-sections comprising a series of four plates forming a spout, each plate in succession having an edge substantially abutting the adjacent plate in one direction around the spout, whereby the size of the orifice may be varied by sliding an abutting edge relative to the surface which it abuts and means for holding the plates in movable relation.

2. An extrusion device for forms of generally rectangular cross-sections comprising a series of four planar means forming together the sides of a spout, each of said means in combination with an adjacent one of said means being engaged in slidable relation in succession in one direction around the spout whereby to vary the size of the spout, and means for holding the plates in movable relation.

3. An extrusion device for forms of generally rectangular cross-sections comprising a series of four planar means forming together the sides of a spout, each of said means in combination with an adjacent one of said means being engaged in slidable relation in succession in one direction around the spout whereby to vary the size of the spout, one of said members having parts substantially encompassing a slidably related part on the adjacent member.

4. A spout structure for extrusion operations comprising in the relative positions a horizontal bed plate, a generally vertically directed side plate vertically movable along an edge of the bed plate, a vertically adjustable top plate horizontally movable over an edge of said side plate and projectable laterally beyond the formed spout, means to position the vertically movable slide plate against said top plate, an opposing side plate carried horizontally by said top plate in horizontal motion of said top plate, said opposing side plate being vertically movable along an edge of the top plate in vertical adjustment of the top plate.

5. A spout structure for extrusion operations comprising in the relative positions two substantially horizontal vertically spaced plates adjustably separated, and two substantially vertical side walls forming a spout with said plates, one side wall having one edge in substantial contact with the surface of the bottom plate and being slidable in substantial contact with an edge of the top plate, and the other side wall having one edge in substantial contact with the surface of the top plate and being slidable in substantial contact with an edge of the bottom plate.

6. A spout structure for extrusion operations comprising in the relative positions two substantially horizontal vertical spaced plates adjustably separated, two substantially vertical side walls forming a spout with said plates, one side wall having one edge in substantial contact with the surface of the bottom plate and being slidable in substantial contact with an edge of the top plate, and the other side wall having one edge in substantial contact with the surface of the top plate and being slidable in substantial contact with an edge of the bottom plate, means to move the said horizontal plates vertically with respect to each other, and means to cause the last-mentioned side plate to move in its plane for maintaining closure of the spout as the top and bottom plates are moved apart.

7. A spout structure for extrusion operations comprising in the relative positions two substantially horizontal vertically spaced plates adjustably separated, two substantially vertical side walls forming a spout with said plates, one side wall having one edge in substantial contact with the surface of the bottom plate and being slidable in substantial contact with an edge of the top plate, and the other side wall having one edge in substantial contact with the surface of the top plate and being slidable in substantial contact with an edge of the bottom plate, means to move the said horizontal plates horizontally in the direction of the side walls with respect to each other, and means for carrying said first-mentioned side plate with the top plate in its horizontal motion.

8. A spout structure for extrusion operations comprising in the relative positions two substantially horizontal vertically spaced plates adjustably separated, two substantially vertical side walls forming a spout with said plates, one side wall having one edge in substantial contact with the surface of the bottom plate and being slidable in substantial contact with an edge of the top plate, and the other side wall having one edge in substantial contact with the surface of the top plate and being slidable in substantial contact with an edge of the bottom plate, means to move the said horizontal plates vertically with respect to each other, means to move the said horizontal plates horizontally in the direction of the side walls with respect to each other, and means to maintain the described relation of all the plates, as the horizontal plates are moved vertically or horizontally relative to each other.

9. A spout structure for extrusion operations comprising in the relative positions two vertically spaced plates adjustably separated, two substantially vertical side walls forming a spout with said plates, one side wall having one edge in substantial contact with the surface of the bottom plate and being slidable in substantial contact with an edge of the top plate, and the other side wall having one edge in substantial contact with the surface of the top plate and being slidable in substantial contact with an edge of the bottom plate, and means to vary the relation of said vertical spaced plates, whereby they may be parallel or angular.

10. A spout structure for extrusion operations comprising in the relative positions two vertically spaced plates adjustably separated, two substantially vertical side walls forming a spout with said plates, one side wall having one edge in substantial contact with the surface of the bottom plate and being slidable in substantial contact with an edge of the top plate, and the other side wall having one edge in substantial contact with the surface of the top plate and being slidable in substantial contact with an edge of the bottom plate, means to vary the relation of said vertically spaced plates, whereby they may be parallel or angular, and means to move the said plates horizontally in the direction of the side walls with respect to each other.

11. An extruding device comprising a spout, a reciprocal plunger adapted to force material into said spout, a hopper for supplying material forward of the plunger when the latter is rearwardly positioned, a roll at the entrance of the spout, independent means to rotate the roll at a surface speed to exceed the speed of the plunger passing said roll, and independent means to reciprocate the plunger.

12. An extruding device comprising a spout, a plunger adapted to force material into said spout, means to reciprocate the plunger, one wall of the spout being adjustably movable relative to its opposing wall to vary the distance between them in adjusting the size of the spout, said plunger being wider in the said dimension than said distance, the said movable wall being cut away to accommodate the said large plunger, and a plate carried by the plunger in slidable relation to said movable wall to seal the cut-away space during rear positions of the plunger.

13. An extruding device comprising a spout, a plunger adapted to force material into said spout, means to reciprocate the plunger, one wall of the spout being adjustably movable relative to its opposing wall to vary the distance between them in adjusting the size of the spout, said plunger being wider in the said dimension than said distance, the said movable wall being cut away to accommodate the said large plunger, a plate carried by the plunger in slidable relation to said movable wall to seal the cut-away space during rear positions of the plunger, said plate being engaged by and movable laterally with said movable plate, and having a loose sliding anchorage along the face of the plunger.

14. A machine having a substantially rectangular spout of adjustable size comprising a plurality of members forming said spout, the members forming the sides of said spout being adjustably separated, the members forming the top and bottom of said spout being adjustably separated, the said members being slidably related to each other whereby angular and parallel relations may exist between the top and bottom, means for mounting the top portion of said spout at the forward end, and means for mounting the top portion of said spout at the rearward end, means for raising and lowering the forward-end mounting means, and means for raising and lowering the rearward-end mounting means.

15. A machine having a substantially rectangular spout of adjustable size comprising a plurality of members forming said spout, the members forming the sides of said spout being adjustably separated, the members forming the top and bottom of said spout being adjustably separated, the said members being slidably related to each other whereby angular and parallel relations may exist between the top and bottom, means for mounting the top portion of said spout at the forward end, and means for mounting the top portion of said spout at the rearward end, means for raising and lowering the forward-end mounting means, means for raising and lowering the rearward-end mounting means, and means for operating said two raising and lowering means together to the same extent to move the top of the spout in vertical motion.

16. A machine having a substantially rectangular spout of adjustable size comprising a plurality of members forming said spout, the members forming the sides of said spout being adjustably separated, the members forming the top and bottom of said spout being adjustably separated, the said members being slidably related to each other whereby angular and parallel relations may exist between the top and bottom, one top forming member being vertically and horizontally movable, one side member being vertically slidable with respect to and being movable horizontally with said horizontally movable top member, means for supporting said horizontally movable top member for horizontal sliding in adjusting the horizontal width of the spout, said means being also capable of vertical adjustment to vary the vertical width of said spout.

17. A machine having a substantially rectangular spout of adjustable size comprising a plurality of members forming said spout, the members forming the sides of said spout being adjustably separated, the members forming the top and bottom of said spout being adjustably separated, the said members being slidably related to each other whereby angular and parallel relations may exist between the top and bottom, one top-forming member being vertically and horizontally movable, one side member being vertically slidable with respect to and being movable horizontally with said horizontally movable top member, separate means for supporting the forward and rearward ends of said top member for horizontal motion, and separate means for raising and lowering the said mounting means, whereby angularity and vertical adjustments of said top member are permitted.

18. A machine having in combination a substantially rectangular spout of adjustable size including therein means forming two opposing walls of the spout, said means being adjustably spaced and movable to provide both parallel and angular wall relations, and means for holding and adjusting the relative spaced positions of the said wall forming means at one point along the spout, and separately operable means for holding and adjusting the relative spaced positions of the said wall forming means at a point elsewhere along said spout remote from the first point, one of said walls being movable in its plane with respect to both of said means, whereby to permit adjustment of the spout in said direction.

19. A machine having in combination a spout which is adjustable horizontally, means providing plunger action into and out of said spout in any position of adjustment of the spout, a hopper positioned to drop material therein before the plunger in its rearward position, said hopper covering the largest horizontal width of said spout, and a movable side wall inside said hopper forming an adjustable wall for said spout whereby its effective dimension at the discharge end corresponds substantially to the actual effective width of the spout.

ALLEN L. SPAFFORD.